United States Patent [19]

Motomura

[11] Patent Number: 5,713,038
[45] Date of Patent: Jan. 27, 1998

[54] MICROPROCESSOR HAVING REGISTER FILE

[75] Inventor: Masato Motomura, Tokyo, Japan

[73] Assignee: NEC Corporation, Tokyo, Japan

[21] Appl. No.: 514,928

[22] Filed: Aug. 14, 1995

[30] Foreign Application Priority Data

Aug. 12, 1994 [JP] Japan ................................. 6-190447

[51] Int. Cl.$^6$ ........................................... G06F 18/78
[52] U.S. Cl. .................. 395/800; 395/405; 395/484; 395/569
[58] Field of Search ........................ 395/800, 569, 395/405, 484

[56] References Cited

U.S. PATENT DOCUMENTS

| | | | |
|---|---|---|---|
| 4,627,024 | 12/1986 | Whalen et al. | 365/189.07 |
| 4,733,346 | 3/1988 | Tanaka . | |
| 4,945,510 | 7/1990 | Maeda et al. | 395/182.13 |
| 5,226,142 | 7/1993 | Vegesna et al. | 365/230.02 |
| 5,276,820 | 1/1994 | Ikenaga et al. | 395/569 |
| 5,333,281 | 7/1994 | Nishikawa et al. | 395/394 |
| 5,491,826 | 2/1996 | Koino | 395/465 |
| 5,557,766 | 9/1996 | Takiguchi et al. | 395/405 |

FOREIGN PATENT DOCUMENTS

| | | |
|---|---|---|
| 0463 855 A2 | 1/1992 | European Pat. Off. . |
| 0511674 | 11/1992 | European Pat. Off. . |
| 0538 817 A2 | 4/1993 | European Pat. Off. . |
| 0560 393 A1 | 9/1993 | European Pat. Off. . |

OTHER PUBLICATIONS

A. Silberschatz, "Operating System Concepts", Addison-Wesley Publishing Company, pp. 87-107.

The SPARC Architecture Manual, Version 8, pp. 23-41 and 189-205.

"Register Connection: A New Approach to Adding Registers into Instruction Set Architectures", Kiyohara, et al., Computer Architecture News, vol. 21, No. 2, May 1, 1993.

Primary Examiner—Larry D. Donaghue
Attorney, Agent, or Firm—Foley & Lardner

[57] ABSTRACT

A microprocessor 1 is coupled to a memory 2, and includes an instruction pipeline 3 and a register file 4. The register file 4 includes an address read/write circuit 5, a plurality of frame address storing registers 6 coupled to the address read/write circuit 5, data read/write circuits 7 and 10, and register banks 8 of the same number as that of the frame address storing registers 6. The register banks 8 is coupled to the data read/write circuits 7 and 10, and all the register banks 8 are composed of the same number of registers 9. The instruction pipeline 3 is coupled to the register file 4 through a register designating bus 104, a data transfer bus 105, and an address transfer bus 106. The instruction pipeline 3 is also coupled to the memory 2 through a memory address bus 101 and an instruction supply bus 102, and the data read/write circuit 10 is coupled to the memory 2 through a data transfer bus 103. At the time of the context switching, the overhead required for the save/restore of the content stored in the register file can be reduced.

8 Claims, 6 Drawing Sheets

MICROPROCESSOR HAVING REGISTER FILE

BACKGROUND OF THE INVENTION

1. Field of the Invention

The present invention relates to a microprocessor, and more specifically to a microprocessor having a register file used for a high speed data access.

2. Description of Related Art

Generally, a microprocessor is provided with a plurality of registers, and a programmed operation is executed in such a manner that data is loaded from a main memory to the register, and an arithmetic and logic operation is executed using the data held in the registers, and then, the result of the operation is written into the register, and further, is written from the register to the main memory. The plurality of registers as mentioned above are called in a bundle a "register file". In current microprocessors, it is an ordinary practice that a register file is composed of 32 registers, This register file is small in size in comparison with a memory provided externally of the processor and a cache memory provided internally in the processor, and therefore, can be accessed with a very high speed. In addition, a parallel processing of a plurality of readings/writings can be realized with a relative low cost.

As mentioned above, by effectively using the register file in the microprocessor, it is possible to speed up the processing. On the other hand, such a disadvantage has been encountered in that because of existence of the register file, a change-over of the processing between processes or threads becomes late. Here, the "thread" means a string of instructions obtained by sharing one process into some number of portions which are in parallel to each other or can be executed in parallel to each other. This "change-over of the processing between processes or threads" is called a context switching, and in the microprocessor, this context switching frequently occurs at the time of the change-over of the processes or threads and at the time of an interrupt processing.

If the context switching occurs, since the register file is used for a new process or thread, in order to comply this context switching, it becomes necessary to save the current execution environment, namely, the current contents of the register file into the main memory. Ordinarily, in the conventional microprocessor, the occurrence of the context switching becomes a large overhead in the processing.

The following is the reason for why the conventional microprocessor requires a substantial time in order to comply with the context switching. First, an operating system or a user's level library is required to intervene, and secondly, the current execution environment to be saved includes a large amount of information.

One of the reasons for why the operating system or the user's level library is required to intervene, is that an address of a memory space to which the content of the register file should be saved, is not previously set. Therefore, the operating system executes such a proceeding that a data saving region is secured in the memory, and the contents of the register file and a program counter are stored in the secured data saving region. This execution environment may be called a "processor status", from the viewpoint of such meaning that an address is not allocated in the memory space and hardware is maintained in the microprocessor.

The above mentioned context switching has been explained in many textbooks in the field of a computer science and the operating system, for example, A. Silberschatz, J. Peterson and P. Galvin "Operating System Concepts" Addison-Wesley Publishing Company, page 106, the disclosure of which is incorporated by reference in its entirety into the present application. In this book, the reason for the intervention of the operating system or the user's level library is mentioned to secure the content stored in the register file.

In order to overcome the above mentioned problem of the context switching, the prior art has proposed a register window technique, which is adopted in the register file of a SPARC architecture which is famous as one means for a RISC (reduced instruction set computer) architecture of the microprocessor. The register window technique has been explained in detail in many textbooks in the field of a computer science, for example, Prentice Hall, "The SPARC Architecture Manual", SPARC International, Inc., Chapter 4, the disclosure of which is incorporated by reference in its entirety into the present application.

Now, a basic conception and operation of the register file based on the register window technique will be described with reference to FIG. 1, which illustrates a plurality of register windows included in the register file.

Figure 1:
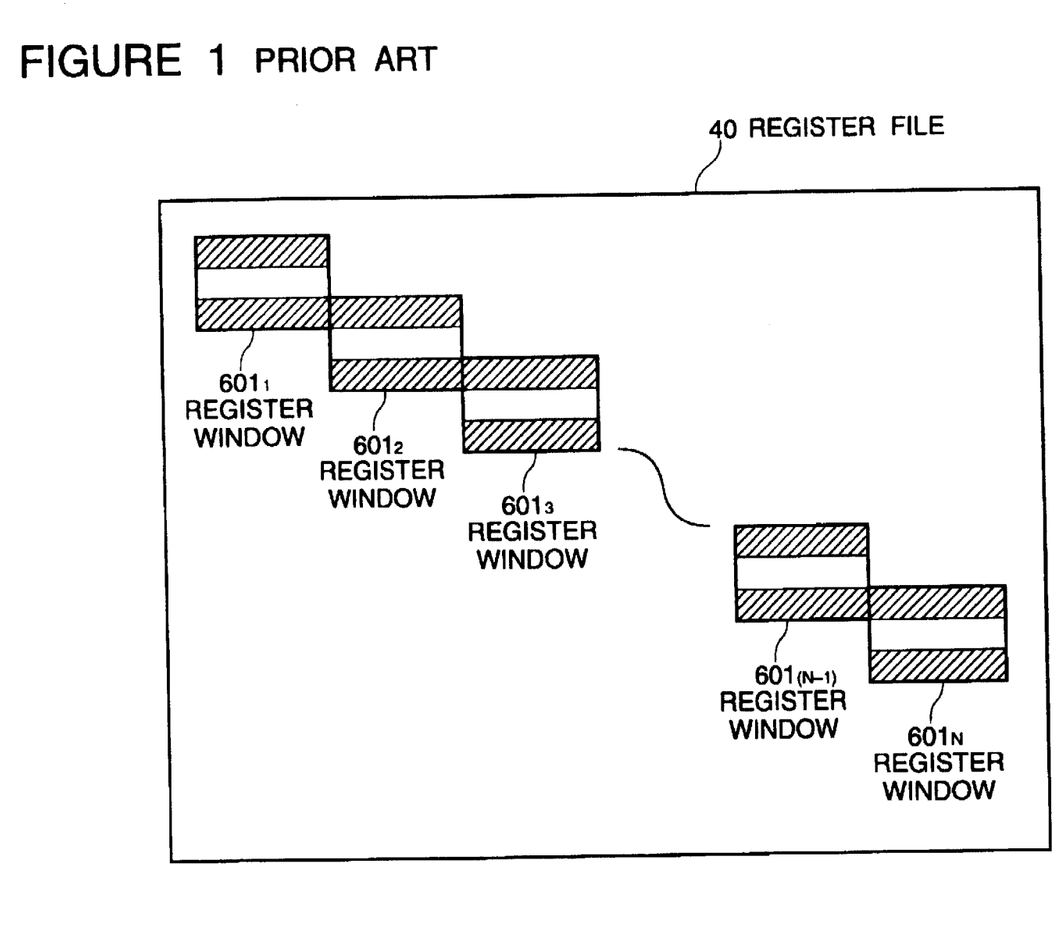
FIG. 1 illustrates the conventional window register technique.

As shown in FIG. 1, the register file, generally designated by Reference Numeral 40, is divided into N register windows including a register window $601_1$, a register window $601_2$, a register window $601_3$, ..., a register window $601_{(N-1)}$, and a register window $601_N$. These register windows partially overlap each other. In FIG. 1, the hatched portion shows an overlapping portion of each pair of adjacent register windows.

Now, assuming that at the time of a function call, a calling function uses a certain window, and a called function uses a window next to the window used by the calling function. In this manner, since separate windows are used, it is no longer necessary to save and restore the content of the registers in response to the function calling, differently from the conventional register file. The overlap between the register windows is used for transfer the argument between the functions.

As mentioned above, the register window technique has been developed in order to speed up the function calling. However, as mentioned in the appendix D of the above referred "The SPARC Architecture Manual", the disclosure of which is incorporated by reference in its entirety into the present application, the register window technique may be used in order to speed up the context switching, for example by allocating each window to each process or thread. Thus, similarly to the function calling, the saving and restoring of the content of the register in response to the context switching is no longer necessary. In this case, however, it is not possible to use the overlap between the register windows.

As mentioned hereinbefore, in the conventional microprocessor, the register file is indispensable in elevating the performance of the microprocessor. However, when the context switching occurs, the content of the register file must be saved into the memory, resulting in the generation of a large overhead. This overhead becomes a serious problem in an application environment in which the context switching occurs frequently. This becomes a hindrance in working, for example, in embedded system in which a microprocessor is used for control an external instrument, or in a parallel processor system using a plurality of microprocessors.

On the other hand, in the conventional register window, if the number of register windows provided in the register file is sufficient, it is advantageous since it is not necessary to save the content of the registers. In addition, it is possible to speed up the context switching. However, if the number of register windows becomes short or insufficient, it becomes necessary for the operating system to intervene so as to save the content of the overflowing register window into the memory. In this case, there is required a processing time longer than that required when the context switching occurs in the conventional register file.

SUMMARY OF THE INVENTION

Accordingly, it is an object of the present invention to provide a microprocessor having a register file, which has overcome the above mentioned defect of the conventional one.

Another object of the present invention is to provide a microprocessor having a new register file which can realize a high speed, more flexible, context switching.

The above and other objects of the present invention are achieved in accordance with the present invention by a microprocessor including at least a register file and an instruction pipeline and so configured that a data load/store processing is performed between the register file and an external memory, the register file comprising:

a plurality of register banks each composed of the same number of registers;

a plurality of frame address storing registers of the same number as that of the plurality of register banks;

a first data read/write means connected to the instruction pipeline through a register designating bus means and a first data transfer bus means and also coupled to the plurality of register banks;

an address read/write means connected to the instruction pipeline through an address transfer bus means and coupled to the plurality of frame address storing registers; and a second data read/write means coupled to the plurality of register banks and connected to the memory, through a second data transfer bus means.

In a preferred embodiment, the microprocessor further includes a plurality of frame status storing registers of the same number as that of the plurality of register banks, and a frame status update means connected to the instruction pipeline through a frame status transfer line means and coupled to the plurality of frame status storing registers.

In a more preferred embodiment, the microprocessor further includes a plurality of register bank number storing registers of the same number as that of the plurality of register banks, and a register bank selection means connected to the instruction pipeline through a register designating line means and coupled to the plurality of register bank number storing registers.

The above and other objects, features and advantages of the present invention will be apparent from the following description of preferred embodiments of the invention with reference to the accompanying drawings.

DESCRIPTION OF THE PREFERRED EMBODIMENTS

Figure 2:
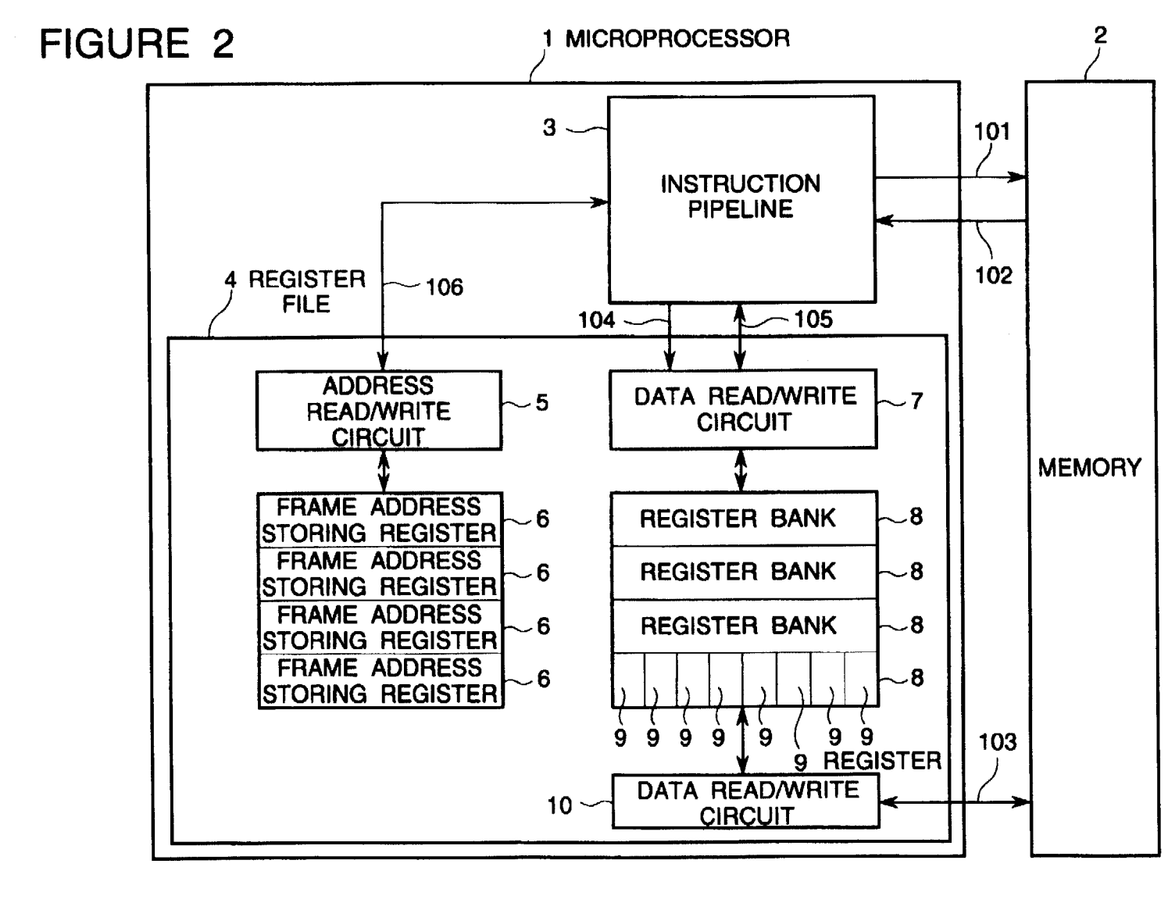
FIG. 2 is a block diagram of a first embodiment of the microprocessor in accordance with the present invention.

Referring to FIG. 2, there is shown a block diagram of a first embodiment of the microprocessor in accordance with the present invention.

The shown microprocessor is generally designated by Reference Numeral 1, and is coupled to a memory 2. The microprocessor 1 includes an instruction pipeline 3 and a register file 4.

The register file 4 includes an address read/write circuit 5, a plurality of frame address storing registers 6 coupled to the address read/write circuit 5, data read/write circuits 7 and 10, and register banks of the same number as that of the frame address storing registers 6. The register banks 8 are coupled to the data read/write circuits 7 and 10, and all the register banks 8 are composed of the same number of registers 9. Within the microprocessor 1, the instruction pipeline 3 is coupled to the register file 4 through a register designating bus 104, a data transfer bus 105, and an address transfer bus 106. The instruction pipeline 3 is also coupled to the memory 2 through a memory address bus 101 and an instruction supply bus 102, and the data read/write circuit 10 is coupled to the memory 2 through a data transfer bus 103. Incidentally, the instruction pipeline 3 is in charge of an internal sequential processing executed in a pipelined fashion in accordance with instructions described in a program.

Now, general operation of the microprocessor 1 will be explained.

First, the instruction pipeline 3 designates through the memory address bus 101 an address within the memory 2, so that an instruction stored in the designated address is read out from the memory 2 and supplied through the instruction supplying bus 102 to the instruction pipeline 3. In the instruction pipeline 3, a processing designated by the read-out instruction is executed. When the designated processing is executed, if data stored in a register 9 in the register banks 8 of the register file 4 is required, or if the result of the processing is to be stored in a register 9 in the register banks 8, the register 9 in the register file 4 is accessed. When a load/store instruction of data not greater than one word is processed, data is transferred between one register 9 and the memory 2 through the data transfer bus 103 and the data read/write circuit 10. The address for the memory 2 is supplied from the instruction pipeline 3 through the memory address bus 101 to the memory 2. Here, the "word" indicates the size or the bit number of data stored in one register 9.

The above is an operation in common to the conventional microprocessor and the microprocessor 1 of the shown embodiment.

In the following, an operation when a load/store instruction of data in units of frame is processed, will be explained. Here, the "frame" is defined to mean data of the same bit number as that of one register bank 8. In the embodiment shown in FIG. 2, for example, four register banks 8 are provided, and each of the register banks 8 is composed of eight registers 9. In this case, the size of one frame is eight words. In addition, the "frame address" means an address in the memory 2 given to this frame.

When a frame load instruction is processed, the frame address is designated through the memory address bus 101 by the instruction pipeline 3, so that the frame stored at a location indicated by the designated frame address is written into the register bank 8 through the data transfer bus 103 and the data read/write circuit 10. Which of the register banks 8 should be written, is designated from the instruction pipeline 3 through the register designating bus 104 and die data read/write circuit 7. In addition, the designated frame address is written into the frame address storing register 6 corresponding to the designated register bank 8, through the address transfer bus 106 and the address read/write circuit 5.

The processing of the frame storing instruction can be performed in two ways. In the first storing way, from which of the register banks 8 the frame is to be stored in the memory 2, is designated through the register designating bus 104 by the instruction pipeline 3. On the other hand, the frame address stored in the frame address storing register 6 corresponding to the designated register bank 8 is used as the frame address indicating a storing location of the memory 2. This frame address is read out by the address read/write circuit 5 and supplied through the address transfer bus 106 to the instruction pipeline 3, so as to be further supplied through the memory address bus 101 to the memory 2.

In the second way, from which of the register banks 8 the frame is to be stored in the memory 2, is designated through the register designating bus 104 by the instruction pipeline 3, and on the other hand, a stored destination frame address is designated through the memory address bus 101 by the instruction pipeline 3. Thus, the designated frame is stored at a location in the memory 2 corresponding to the designated frame address.

Figure 3:
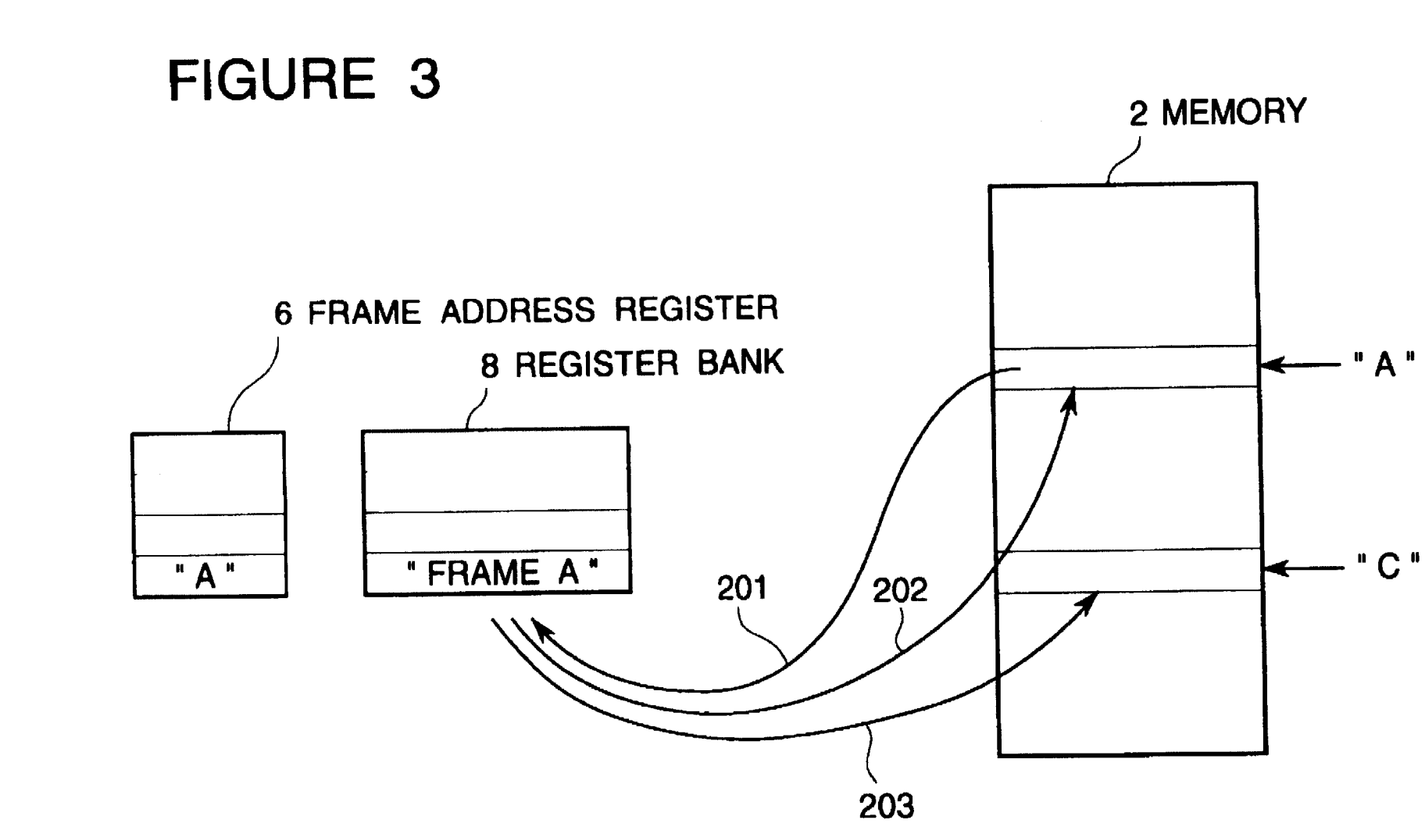
FIG. 3 illustrates a frame address designating method when a data load/store instruction in units of frame is executed in the first embodiment shown in FIG. 2.

Referring to FIG. 3, there are illustrated the frame address designating ways when an instruction for loading/storing data in units of frame is executed in the first embodiment shown in FIG. 2.

Assume that when the frame is loaded from the memory 2 into the register file 4, for example, the frame address "A" is designated. As shown in the operation line 201, the frame stored at a location in the memory 2 designated by the frame address "A", is read out from the memory 2, and stored into the designated register bank 8. In addition, the frame address "A" is stored into the corresponding frame address storing register 6.

In order to store this frame in the above mentioned first way, as shown in the operation line 202, the frame is stored in the read-out original location of the memory 2. On the other hand, in order to store this frame in the above mentioned second way, as shown in the operation line 203, the frame "A" is stored into a location in the memory 2 designated by the frame address "C", regardless of from where in the memory the frame is read out for loading into the register file.

Now, a second embodiment of the microprocessor in accordance with the present invention will be described with reference to FIG. 4, which is a block diagram of a second embodiment of the microprocessor in accordance with the present invention.

The microprocessor of the second embodiment is generally designated by Reference Numeral 14, and is coupled to a memory 15. The microprocessor 14 includes an instruction pipeline 16 and a register file 17.

The register file 17 includes an address read/write circuit 18, a plurality of frame address storing registers 19 coupled to the address read/write circuit 18, a frame status update circuit 20, frame status storing registers 21 of the same number as that of the frame address storing registers 19, data read/write circuits 22 and 25, and register banks 23 of the same number as that of the frame address storing registers 19. The frame status storing registers 21 is coupled to the frame status update circuit 20. The register banks 23 is coupled to the data read/write circuits 22 and 25, and all the register banks 23 are composed of the same number of registers 24.

Within the microprocessor 14, the instruction pipeline 16 is coupled to the register file 17 through a register designating bus 304, a data transfer bus 305, an address transfer bus 306, and a frame status transfer bus 307. The address read/write circuit 18 is coupled to the frame status update circuit 20 through a frame save control line 308. The instruction pipeline 16 is also coupled to the memory 15 through a memory address bus 301 and an instruction supply bus 302, and the data read/write circuit 25 is coupled to the memory 15 through a data transfer bus 303.

In this second embodiment, the newly added frame status storing registers 21 stores information indicating whether or not the frame stored in a corresponding register bank 23 is valid. FIG. 5 is a status transition diagram between the frame validation and the frame invalidation in the second embodiment shown in FIG. 4. In FIG. 5, legends (1), (2) and (A) added to arrowhead curved status transition lines indicate an event which cause any status transition. The status transition (1) shows to load a frame into a corresponding register bank 23, and the status transition (2) shows to write into a register 24 in the register bank 23. The status transition (A) shows to store the frame in accordance with the above mentioned second way.

Now, assume that some frame is invalid (403). If data is written from the instruction pipeline 16 into any of the registers 24 of the register bank 23 that includes the invalid frame, the status changes to valid (401) as shown by the transition line 405. On the other hand, if a frame is newly loaded from the memory 15 into the register bank 23 holding a valid frame (401), the status changes to invalid (403) as shown by the transition line 406, and at the same time, the frame which was valid (401) is stored into the memory 15 in accordance with the second storing way. Namely, the frame address stored in a corresponding frame address storing register 19 is used to designate a memory location in the memory 15, so that the frame which was valid (401) is stored at the designated memory location in the memory 15.

In addition, when data is written from the instruction pipeline 16 into any of the registers 24 of the register bank 23 holding the valid frame (401), the valid status is maintained as it is as shown by the transition line 402. On the other hand, when a frame is newly loaded from the memory 15 into the register bank 23 including an invalid frame (403), the invalid status is maintained as it is as shown by the transition line 404, and the newly loaded frame is overwritten onto the invalid frame (403).

Figure 4:
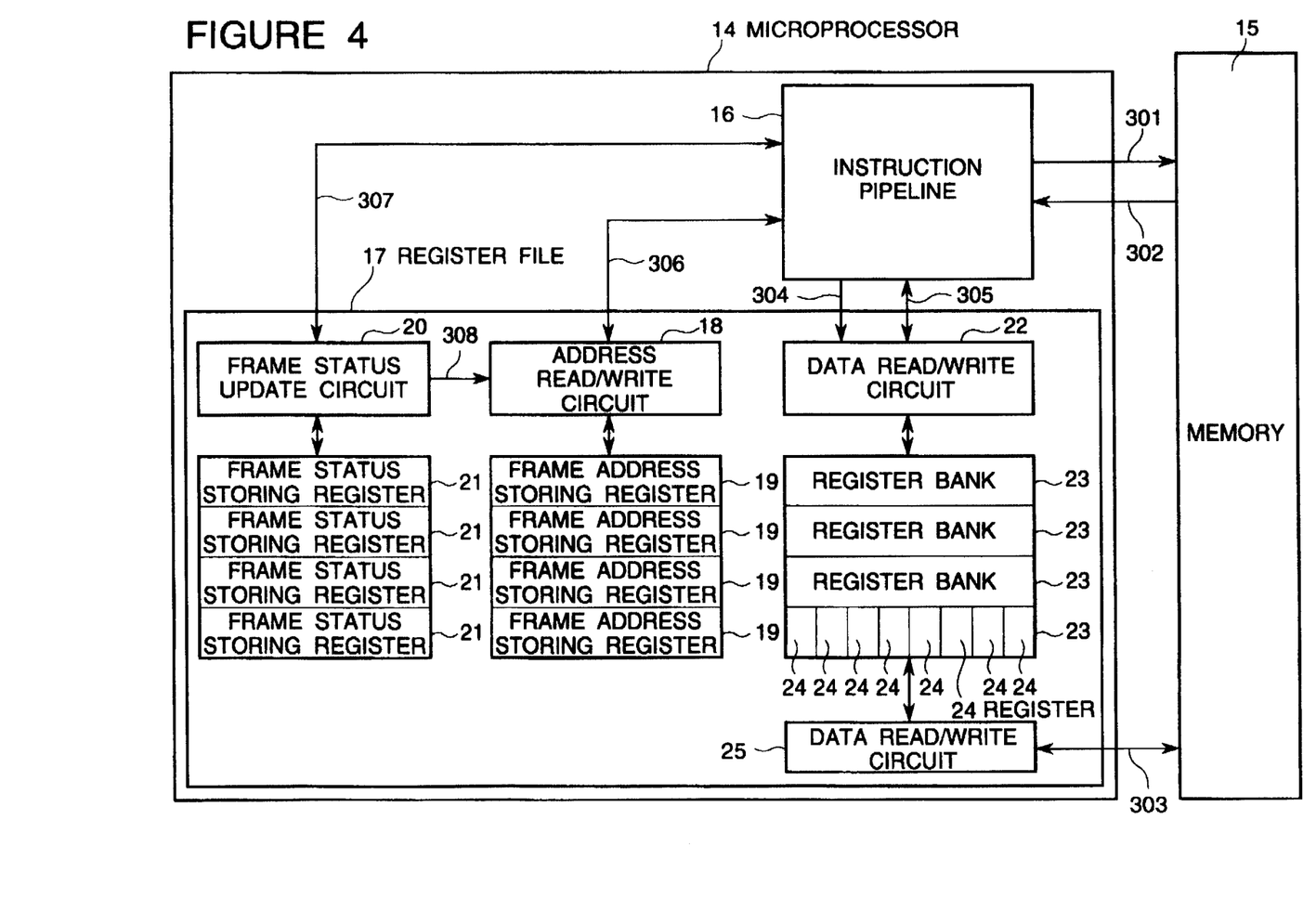
FIG. 4 is a block diagram of a second embodiment of the microprocessor in accordance with the present invention.
Figure 5:
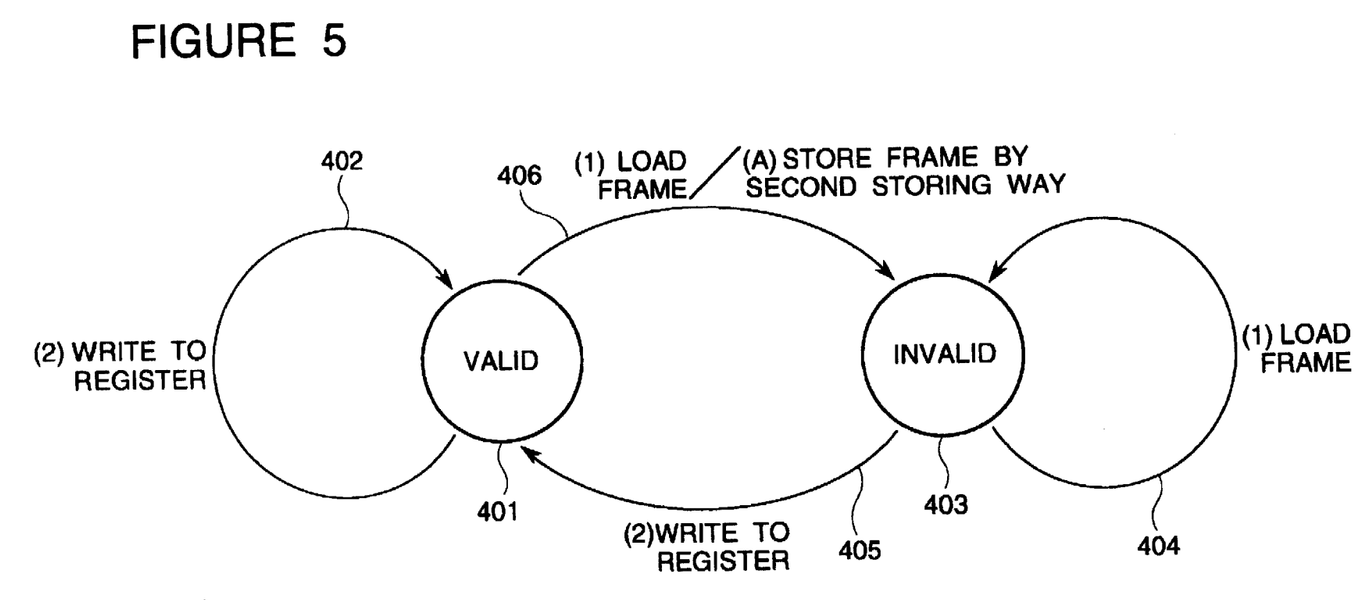
FIG. 5 is a status transition diagram illustrating a frame validation/invalidation in the second embodiment shown in FIG. 4.

In the microprocessor shown in FIG. 4, generation of an event which causes the status transition, is notified from the instruction pipeline 16 through the frame status transfer bus 307 to the frame status update circuit 20, which in turn calculates a next status on the basis of the respective frame status storing registers 21 and updates the content of a required frame status storing register 21.

When a frame is loaded from the memory 15, if a valid frame held in the register bank 23 is saved in accordance with the first storing way in response to the status transition (406), this is notified through the frame save control line 308 to the address read/write circuit 18. In reply to this notification, the frame address of the frame to be saved is read out from the frame address storing register 19, and transferred through the address transfer bus 306 to the instruction pipeline 16. In addition, the fact that it becomes necessary to save the frame in the first storing way, is notified through the frame status transfer line 307 to the instruction pipeline 16. Thus, in the instruction pipeline 16, in accordance with the procedures of the first storing way, the frame concerned is stored or saved into the memory 15, and thereafter, the designated frame is loaded into the register bank 23.

Figure 6:
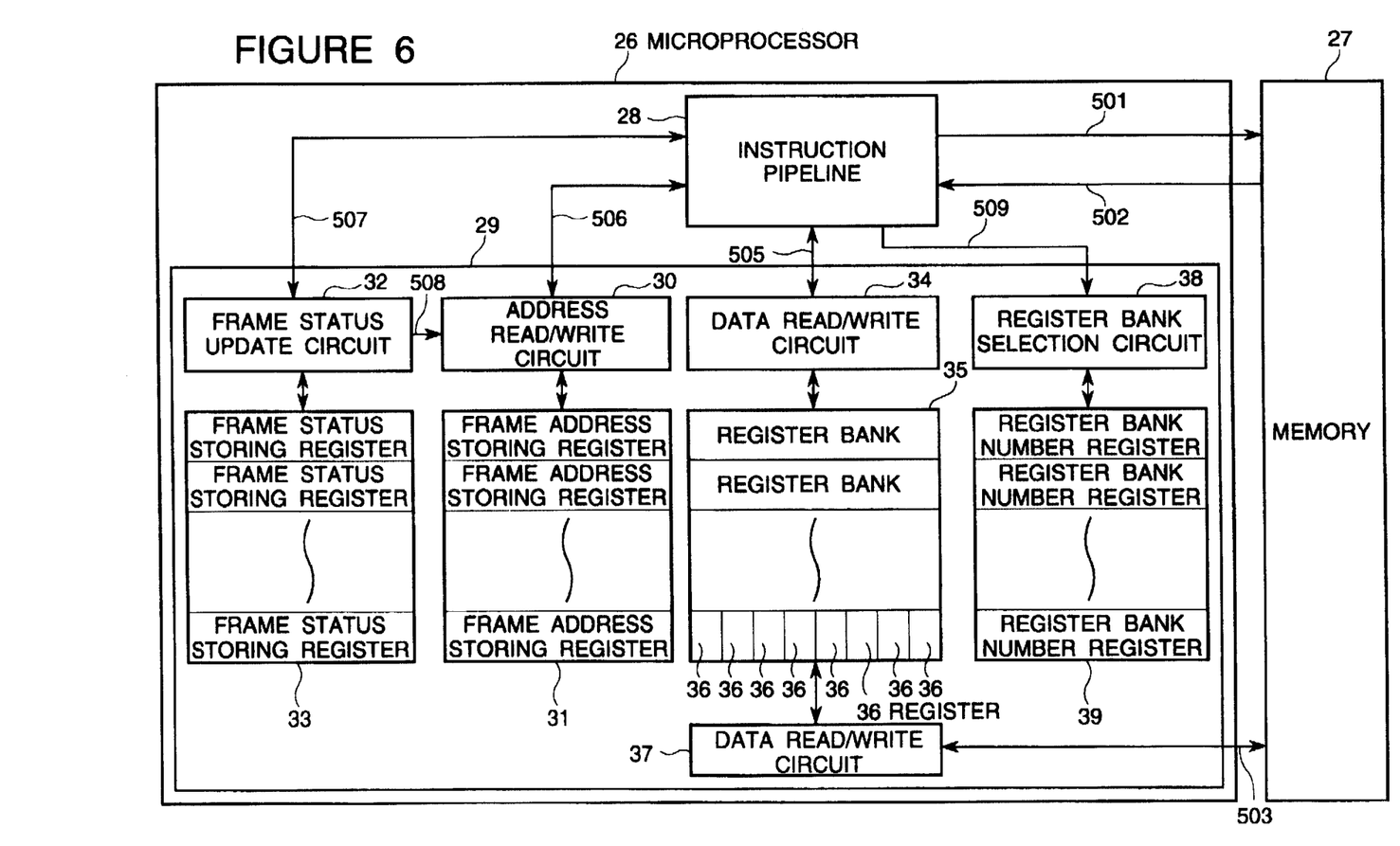
FIG. 6 is a block diagram of a third embodiment of the microprocessor in accordance with the present invention.

Referring to FIG. 6, there is shown a block diagram of a third embodiment of the microprocessor in accordance with the present invention.

The microprocessor of the third embodiment is generally designated by Reference Numeral 26, and is coupled to a memory 27. The microprocessor 26 includes an instruction pipeline 28 and a register file 29.

The register file 29 includes an address read/write circuit 30, a plurality of frame address storing registers 31 coupled to the address read/write circuit 30, a frame status update circuit 32, frame status storing registers 33 which are of the same number as that of the frame address storing registers 31 and which are coupled to the frame status update circuit 32, data read/write circuits 34 and 37, register banks 35 which are of the same number as that of the frame address storing registers 31 and which are coupled to data read/write circuits 34 and 37, a register bank selection circuit 38, and register bank number registers 39 which are of the same number as that of the frame address storing registers 31 and which are coupled to the register bank selection circuit 38. All the register banks 35 are composed of the same number of registers 36.

Within the microprocessor 26, the instruction pipeline 28 is coupled to the register file 29 through a data transfer bus 505, an address transfer bus 506, a frame status transfer bus 507 and a register designating bus 509. The address read/write circuit 30 is coupled to the frame status update circuit 32 through a frame save control line 508. The instruction pipeline 28 is also coupled to the memory 27 through a memory address bus 501 and an instruction supply bus 502, and the data read/write circuit 37 is coupled to the memory 27 through a data transfer bus 503.

In comparison with the second embodiment, this third embodiment is characterized by newly comprising the register bank selection circuit 38 and the plurality of register bank number registers 39. In the first and second embodiments shown in FIGS. 2 and 4, the number of the register banks 8 and 23 in the register files 4 and 17 is limited by the size of register set, but in this third embodiment, the number of the register banks 35 can be freely set. Here, the "size of register set" means the number of registers which can be designated from an instruction of a processor. Differently from the restriction in the first and second embodiments, this third embodiment can set the number of register banks 35 to the effect that the number of the registers 35 within the register file 29 is larger than the size of register set. With this arrangement, each of the register bank number registers 39 associated to the register banks 35 stores the register bank number indicating to which register bank in the register set the associated register bank 35 corresponds.

For example, assume that each of the register banks 35 is composed of eight registers, and the "size of register set" is 32 registers. In this case, it would be understood that the register set is constituted of four banks, namely, bank "0" to bank "3". Therefore, the register bank number can take four values from "0" to "3". In the third embodiment, on the other hand, it is sufficient if the number of the register banks 35 included in the register file 29 is not smaller than four, but it is not required to be four. Instead, the register bank number in the register set is stored in the register bank number register 39, so that the register bank 35 is indirectly accessed. Namely, the register bank selection circuit 38 compares the register 36 or the register bank 35 designated by the instruction pipeline 28 through the register designating bus 509, with the register bank number stored in the register bank number registers 39, and if coincidence is obtained, the coincident register bank 35 is accessed.

In order to load a new frame, the register bank 35 storing an invalid frame is selected by the register bank selection circuit 38, and the frame is stored in the selected register bank 35. The register bank number of the loaded destination is stored in the register bank number register 39 corresponding to the register bank 35 loaded with the frame, and also, the frame address of the loaded frame is stored in the corresponding frame address storing register 31. The status of the corresponding frame state storing register 33 is changed in accordance with the status transition procedure explained in connection with the second embodiment.

Incidentally, if a plurality of invalid register banks exist, the register bank selection circuit 38 determines or selects which of the invalid register banks should be loaded with the frame. For example, it can be considered to select in accordance with an algorithm such as an LRU (Least Recently Used) algorithm.

As explained above, the present invention is characterized in that the address in the memory space is given to the data stored in the registers and held in the register file. With this arrangement, it is no longer necessary to save the data stored in the registers, into the memory space of the operating system. Instead, the data can be automatically saved to a location of a given address by means of hardware if necessary. Thus, it is possible to avoid the drop of the processing speed at the time of the context switching.

In addition, by adding the means for discriminating whether the frame stored in the respective register banks is valid or invalid, the above mentioned automatic frame saving can be performed effectively. In this point, it is possible to avoid the drop of the processing speed at the time of the context switching.

Furthermore, the register bank number register is associated to each of the register banks, so that the register bank number in the register set is stored in the register bank number register. With this construction, it becomes possible to cause the register bank in the register set to virtually correspond to the register bank in the register file. Namely, the register banks of the number larger than the number of register banks which can be actually designated by instructions, are prepared as hardware, and some of the register banks are allocated to the register set. In this construction, it is possible to reduce the number of the automatic saving by the hardware at the time of the context switching. Therefore, it is possible to further speed up the processing speed at the time of the context switching.

Differently from the conventional register window technique, the register file in accordance with the present invention is such that each frame has the frame address in the memory. Accordingly, it is possible to store the frame into the memory, by means of the hardware means. Thus, when an overflow occurs in the register file, the time required for processing the overflow can be shortened. Similarly, it is possible to further speed up the processing speed at the time of the context switching.

Since the unit of data which is called the frame and which is composed of a plurality of words, is newly introduced, and since the address in the memory is given in units of frame. This is very effective in reducing the overhead in the hardware, in comparison with the case in which an address is given for each register. In addition, if a batch transfer in units of frame is combined with the register file in the present invention, it is possible to further speed up the processing speed.

The invention has thus been shown and described with reference to the specific embodiments. However, it should be noted that the present invention is in no way limited to the details of the illustrated structures but changes and modifications may be made within the scope of the appended claims.

I claim:

1. A microprocessor including at least a register file and an instruction pipeline and so configured that a data load/store processing is performed between the register file and an external memory, the register file comprising:

a plurality of register banks each composed of the same number of registers:

a plurality of frame address storing registers of the same number as that of said plurality of register banks;

a first data read/write means connected to said instruction pipeline through a register designating bus means and a first data transfer bus means and also coupled to said plurality of register banks;

an address read/write means connected to said instruction pipeline through an address transfer bus means and coupled to said plurality of frame address storing registers; and a second data read/write means coupled to said plurality of register banks and connected to said memory through a second data transfer bus means further including:

a plurality of frame status storing registers of the same number as that of said plurality of register banks; and a frame status update means connected to said instruction pipeline through a frame status transfer line means and coupled to said plurality of frame status storing registers.

2. A microprocessor claimed in claim 1 further including:

a plurality of register bank number storing registers of the same number as that of said plurality of register banks; and a register bank selection means connected to said instruction pipeline through a register designating line means and coupled to said plurality of register bank number storing registers.

3. A microprocessor claimed in claim 2 wherein said register bank number storing register corresponding to one of said register banks stores the register bank number for a frame stored in said corresponding register bank, so that, when said register file is accessed, the register bank number is designated, and the register bank corresponding to said register bank number storing register holding the designated register bank number is accessed.

4. A microprocessor claimed in claim 3 wherein said frame status storing register corresponding to one of said register banks stores information as to whether the frame stored in said corresponding register bank is "valid" or "invalid", and, when said frame is loaded from said memory to said corresponding register bank, if said frame status storing register corresponding to said corresponding register bank indicates "invalid", said frame stored in said corresponding register bank is automatically stored into said memory.

5. A microprocessor claimed in claim 4 wherein when data is written by said instruction pipelined into some register in one register bank of said register banks, the status stored in said frame status storing register corresponding to said one register bank is brought to indicate "valid" and when a new frame is loaded from said memory into some register in one register bank of said register banks, the status stored in said frame status storing register corresponding to said one register bank is brought to indicate "invalid".

6. A microprocessor claimed in claim 1 wherein said frame status storing register corresponding to one of said register banks stores information as to whether the frame stored in said corresponding register bank is "valid" or "invalid", and, when said frame is loaded from said memory to said corresponding register bank, if said frame status storing register corresponding to said corresponding register bank indicates "invalid", said frame stored in said corresponding register bank is automatically stored into said memory.

7. A microprocessor claimed in claim 6, wherein when data is written by said instruction pipelined into some register in one register bank of said register banks, the status stored in said frame status storing register corresponding to said one register bank is brought to indicate "valid" and when a new frame is loaded from said memory into some register in one register bank of said register banks, the status stored in said frame status storing register corresponding to said one register bank is brought to indicate "invalid".

8. A microprocessor including at least a register file and an instruction pipeline and so configured that a data load/store processing is performed between the register file and an external memory, the register file comprising:

a plurality of register banks each composed of the same number of registers:

a plurality of frame address storing registers of the same number as that of said plurality of register banks;

a first data read/write means connected to said instruction pipeline through a register designating bus means and a first data transfer bus means and also coupled to said plurality of register banks;

an address read/write means connected to said instruction pipeline through an address transfer bus means and coupled to said plurality of frame address storing registers; and a second data read/write means coupled to said plurality of register banks and connected to said memory through a second data transfer bus means;

wherein said frame is defined to be data having the same bit length as that of said register bank, and a frame address is defined to indicate an address in said memory where said frame is stored, wherein said frame is loaded from said memory to said register file in accordance with a load procedure, in which said frame address and said register bank are designated, and said frame stored in said memory at said designated frame address is read out to be loaded in said designated register bank, and said designated frame address is stored in said frame address storing register corresponding to said designated register bank, and wherein said frame is stored into said memory from said register file either in accordance with a first storing procedure, in which said register bank is designated, a storing memory location in said memory is designated by said frame address stored in said frame address storing register corresponding to said designated register bank, and then, said frame stored in said designated register bank is read and stored into said designated storing memory location in said memory, or in accordance with a second storing procedure, in which said frame address and said register bank are designated, and said frame stored in said designated register is read and stored into a memory location in said memory designated by said designated frame address.

* * * * *